United States Patent [19]

Voet

[11] Patent Number: 5,146,148
[45] Date of Patent: Sep. 8, 1992

[54] PROCESS AND A DEVICE FOR CHANGING THE EFFECTIVE SPEED OF A POLYPHASE ASYNCHRONOUS MOTOR AND A SUITABLE MOTOR SYSTEM FOR THE APPLICATION OF THE PROCESS

[75] Inventor: Eduard J. Voet, Carasso, Switzerland

[73] Assignee: Europe Patent Ltd., Dublin, Ireland

[21] Appl. No.: 536,690

[22] PCT Filed: Oct. 30, 1989

[86] PCT No.: PCT/CH89/00188
§ 371 Date: Aug. 30, 1990
§ 102(e) Date: Aug. 30, 1990

[87] PCT Pub. No.: WO90/05407
PCT Pub. Date: May 17, 1990

[30] Foreign Application Priority Data

Nov. 4, 1988 [CH] Switzerland ............ 4096/88
Feb. 22, 1989 [CH] Switzerland ............ 725/89

[51] Int. Cl.$^5$ ............................................. H02P 5/40
[52] U.S. Cl. ............................ 318/803; 318/807; 318/34; 388/814
[58] Field of Search ............................ 318/801–803, 318/807–811, 700, 705, 34, 52, 47; 388/814, 815, 811, 823, 824, 917

[56] References Cited

U.S. PATENT DOCUMENTS

| | | | |
|---|---|---|---|
| 4,418,308 | 11/1983 | Bose | 318/811 |
| 4,437,051 | 3/1984 | Muto et al. | 318/808 |
| 4,575,667 | 3/1986 | Kurakake | 318/803 |
| 4,767,976 | 8/1988 | Mutoh et al. | 318/808 |
| 4,825,131 | 4/1989 | Nozaki et al. | 318/52 |
| 4,965,897 | 10/1990 | Jurkawski et al. | 388/814 |

FOREIGN PATENT DOCUMENTS

| | | |
|---|---|---|
| 116595 | 6/1982 | Japan. |
| 012382 | 1/1987 | Japan. |
| 476643 | 11/1975 | U.S.S.R.. |
| 752715 | 7/1980 | U.S.S.R.. |
| 985912 | 1/1983 | U.S.S.R.. |
| 1034140 | 8/1983 | U.S.S.R.. |
| 1100696 | 6/1984 | U.S.S.R.. |
| 1222937 | 5/1986 | U.S.S.R.. |
| 1339850 | 9/1987 | U.S.S.R.. |
| 1515309 | 10/1989 | U.S.S.R.. |

Primary Examiner—William M. Shoop, Jr.
Assistant Examiner—John W. Cabeca
Attorney, Agent, or Firm—Egli International

[57] ABSTRACT

The stator current has a variable frequency which is changed by using a predetermined frequency change rate. The resulting effective value of the stator current is compared with the current control variable. If it is greater the frequency is now kept constant. If this corresponds to the setpoint speed the process terminates, if not, the frequency change will start again as soon as the effective value gets smaller than the current control variable. An a.c. voltage mains may operate, accelerate or brake the motor via a rectifier and an inverter, in cases of voltage failure the stator current is switched through to a load resistor. The variation of the speed may follow a steady or a garland-shaped course, from the from and dimension of a festoon element a measure for the "torsional rigidity" may be obtained. By means of shifting between star connection and delta connection the frequency range may be expanded in order to keep the torque essentially the same.

For performing the process a motor system may be used comprising several motors having the same torque and harmonized with each other by using $\sqrt{3}$ or $\sqrt{2}$ as quotient for the characteristic operating voltage/operating frequency values.

17 Claims, 4 Drawing Sheets

PROCESS AND A DEVICE FOR CHANGING THE EFFECTIVE SPEED OF A POLYPHASE ASYNCHRONOUS MOTOR AND A SUITABLE MOTOR SYSTEM FOR THE APPLICATION OF THE PROCESS

BACKGROUND OF THE INVENTION

1. Field of the Invention

The invention relates to a process devised for changing the effective speed of a polyphase asynchronous motor until it reaches a setpoint speed, the polyphase stator current of the motor having a variable frequency and its effective value being determined by a current control variable, and a device for the application of the process plus a suitable motor system for the application of the process.

2. Discussion of the Prior Art

The control of speed and torque of a polyphase asynchronous motor is per se well-known and may for example be implemented by means of an inverter.

For instance, it is known from U.S. Pat. No. 4,825,131, by Nozakietal, to compare the stator current of the motor with a current control variable in order to infer from it the stator current to be supplied by the inverter to the motor and its frequency. In this way, the speed of the motor may be brought to a desired value and be kept there, while the torque of the motor may be controlled according to the current control variable. This state of the art is a typical current limiting control for the continuous running duty of the motor whose purpose it is to provide optimum control of the motor in continuous running duty (i.e. in essentially steady conditions).

For optimum motor control in the transient running duty, i.e in conditions which change relatively fast (dynamic control of desired speed changes in the case of changing load) no provisions were made.

SUMMARY OF THE INVENTION

It is the object of this invention to provide a process of the kind mentioned at the outset, a device for the application of this process and a motor system suited for the application of the process with which the maximum utilizable speed range of the motor used is permanently available in the transient running duty and by means of which a maximum of speeds may be covered by a minimum of motor definitions, in particular because speed control requires no limitation of the stator current and no reduction of the stator voltage below the maximum tolerated values of the motor.

The invention is based on the knowledge that (1) the static characteristics of a polyphase asynchronous motor are sufficiently defined if a characteristic torque/speed-curve of the motor is specified which in turn is determined by the magnetic saturation of the iron parts in the motor, and that (2) the dynamic characteristics of the motor are determined by an electrical and a mechanical time constant each, causing the conversion of electrical energy into kinetic energy (or vice versa for generator operation) to be performed in a finite time which is determined by the motor.

The interaction of these static and dynamic motor characteristics results in the motor characteristics being sufficiently defined if a characteristic operating voltage/operating frequency value is specified in combination with the torque. This in turn renders it possible to control the stator current of a specific polyphase asynchronous motor with steady stator voltage/frequency-characteristic curve via its frequency in such manner that the stator current maintains a value predetermined by the current control variable, if the operating conditions (load, torque, etc.) are changing or to be changed. With this process, this predetermined value of the stator current may, in principle, be freely selected.

However, in order to preserve optimum active power of the motor the predetermined value of the stator current needs to be selected from within the range in which the torque of the motor is approximately proportional to the stator current. As a consequence, it is recommended to select the current control variable, which determines the stator current, in such manner that a torque between zero and the breakdown torque of the motor is obtained. For this reason, the current control variable is to be selected from the range between zero and the effective value (depending on the intensity of magnetization) of the stator current with which the breakdown torque is reached.

With the help of these findings, and for reaching the previously mentioned change in speed of a polyphase asynchronous motor, the process according to the invention is characterized in that (a) the frequency of the stator current is changed with a predetermined frequency change rate according to the direction of the desired speed change, (b) the effective value of the stator current which due to the frequency change will now change is measured and compared with the current control variable, (c) if the measured effective value of the stator current is greater than the current control variable the frequency is kept temporarily at the attained value, (d) the attained frequency is compared with the setpoint speed, (e) if the attained frequency corresponds to the setpoint speed when considering a slip of the motor corresponding to the current control variable, frequency is definitively kept constant at the attained value, which terminates the process, (f) if this is not the case, the frequency is kept constant until the effective value of the stator current, which is now decreasing due to the change in speed, has become smaller than the current control variable and the sequence of process steps starting at process step (a) is then repeated.

With this process the speed change may be either acceleration or slowing down. If the polyphase stator current of the motor is supplied by an inverter which draws electrical energy from an a.c.voltage source and obtains it as direct current by way of a rectifier, the motor may be accelerated or slowed down by the supplied electrical energy. The motor is braked in any case, if the inverter draws electrical energy from the polyphase stator current of the motor in the case of a voltage failure in the a.c.voltage source, converts it to DC and switches it through to an energy storage facility and/or load resistance.

It is possible and essentially equivalent to measure the effective value of the stator current directly at the AC-side of the inverter or indirectly at the DC-side of the inverter (e.g. as voltage drop at a measuring resistor).

By the process according to the invention, the speed is changed essentially—while keeping the torque constant—to the value corresponding to the current control variable. If expressed in a simplified way, in the course of the process according to the invention the energy flow is directed into the rotor by way of the frequency with frequency-proportional stator current. In this way it may be prevented that the motor, with high slip, reduced efficiency and high power loss in the rotor is working in a range, where the current is not proportional to the torque. The speed change may be optimized insofar as it may be done either e.g. with the maximum tolerated stator current and torque (breakdown torque) or e.g. with the maximum or optimum load-compatible torque. If acceleration or slowing down is done with maximum tolerated torque, the motor develops its optimum characteristics with regard to dynamics and efficiency, which are delineated by physical limits, i.e. it has the smallest electrical and mechanical time constant. In other words, the rate of change in speed in relation to time will then be maximized.

In the case of the acceleration the momentary value of the stator current will depend on the momentary frequency of the inverter, while the effective stator voltage will depend on the motor connection (star connection or delta connection or quadrangle connection), and the maximum value of the possible stator voltage is determined by the line voltage-dependent d.c. voltage. In this way, it is always the highest driving power possible with the used line voltage that is fed to the motor.

If the variation of the stator voltage in respect of frequency deviates from the characteristic operating voltage/operating frequency value of the motor because of insufficient line voltage, the result will be a so-called field weakening.

In a first embodiment of the process the frequency change rate may be chosen as being so small that the resulting variation of the speed in respect of time follows an essentially steady course, because the effective value of the stator current does not become noticeably greater than the current control variable and the frequency is thus kept constant during an infinitely short period of time. For this purpose, the frequency change rate is for example chosen in such manner that the resulting frequency change does not exceed approx. 3 to 5% of the momentary frequency, i.e. about half of the motor slip. The appropriate frequency change rate is related to the respective electrical time constant of the used motor which in turn is related to the motor system as relative variable. An appropriate frequency change rate is for example 0.1 Hz/µs for an application for the driving of high-velocity spindles.

In a second embodiment of the process the frequency change rate may be chosen as being so high that the characteristic curve of the resulting variation of the speed in respect of time is formed essentially as festoon, i.e. in the shape of garland, because the effective value of the stator current becomes noticeably greater than the current control variable with each frequency change and the frequency is thus kept constant during a sensible interval. This interval during which the motor increases its speed by converting electrical energy into mechanical energy depends solely on certain characteristics of the drive, i.e. on an inductive electrical variable, on the efficiency of the motor, on the moment of inertia of the motor, on the moment of inertia of the load and on the load moment caused by the load. The mentioned interval is therefore a consequence of the immediately preceding frequency change and is solidly related to it so that the form of a single element of the festoon renders it possible to describe the mentioned characteristics of the drive. These characteristics of the drive show a certain analogy to the torsional rigidity of a shaft: they may therefore be designated as "torsional rigidity of the drive". This specific analysis of the variation of the frequency in respect of time, i.e. of the characteristic values (an electrical and a mechanical constant) designating the form and dimension of an element of the garland-shaped characteristic curve, may for instance be done by means of a microcomputer programmed for this specific purpose which calculates and possibly displays the specification of a measure for the "torsional rigidity of the drive".

It must be stated that for the application of the process, according to the invention, it is not necessary to measure the speed of the motor or its slip. A particular speed sensor is not required. Hence, the device needed for the application of the process, according to the invention, is correspondingly simple. The slip essentially adjusts to the constant value determined by the current control variable. This also leads to the adjustment of a constant power loss, which maintains the thermal and kinetic operating conditions advantageously constant if the current control variable is chosen as equaling the load current. In the case of a deceleration it may be established before the next frequency change has been effectuated that the frequency of the stator current is smaller than a predetermined limiting value and the inverter may then be controlled in such manner that it feeds d.c. current to the stator of the motor in order to stop the rotor, or to use this process as vector-controlled d.c. current in order to bring the rotor or an object moved by the rotor into a defined position by means of position sensors or to let it perform very slow rotating motions (lowest speed range).

In the course of this process the intensity of the direct current may at first, during a predetermined period of time, be essentially equal to the effective value of the nominal current of the motor and then be reduced to a fraction of the mentioned intensity. Also these processes may be effectuated with the help of a microcomputer which has been programmed for this specific purpose.

In order to perform the previously mentioned functions a control superposed to the inverter contains a microcomputer which has been programmed accordingly, e.g. so as to send the appropriate signals for the ignition of switchable semiconductor elements, e.g. of the IGBT-type ("isolated gate bipolar transistor") to the inverter at the appropriate time.

The current control variable and the frequency change rate as well as the characteristic operating voltage/operating frequency value and the stator current for the maximum torque of the employed polyphase asynchronous motor are e.g. input manually. At the d.c.-side of the inverter for example a measuring resistor connected in series between the rectifier and the inverter is provided in order to measure the stator current as value of a voltage drop at this measuring resistor, this value being transmitted to the control, i.e. the microcomputer.

The fact that the process according to the invention is based on a constant characteristic operating voltage/operating frequency value of a polyphase asynchronous motor with delivery of the nominal torque in continuous running duty in order to control the motor via the frequency of the stator current also brings about that it is possible to essentially expand with simple means the frequency range which may be utilized with a given polyphase asynchronous motor.

For, if the operation of the inverter is shifted between the motor feed according to its characteristic operating voltage/operating frequency value for a star connection and the motor feed according to the characteristic operating voltage/operating frequency value for a delta connection (for a three-phase motor) and quadrangle connection (for a four-phase motor) and if the characteristic operating voltage/operating frequency value that has been input into the control is reduced by a factor of $\sqrt{3}$ or $\sqrt{2}$ the utilizable speed range may be increased by the same factor of $\sqrt{3}$ or $\sqrt{2}$ with the torque remaining essentially constant, which also increases the driving power by the same factor of $\sqrt{3}$ or $\sqrt{2}$.

However, it is also possible to simultaneously change the frequency of the stator current in the same direction by the same factor as the characteristic operating voltage/operating frequency value input into the control, in such manner that the magnetization conditions in the stator and thus the torque of the motor remain constant. In the case of a three-phase motor the operating voltage/operating frequency values, which may be fed from the control, form a geometric progression of a ratio $1:\sqrt{3}:3:3\sqrt{3}$, i.e. with the quotient $\sqrt{3}$ as law of formation. The utilizable speed range of a given three-phase motor defined by torque and characteristic operating voltage/operating frequency values for star and delta connections will then successively comprise (a) a first range in which the motor is fed in star connection and the characteristic operating voltage/operating frequency value input to the inverter is greater by a factor of $\sqrt{3}$ than the characteristic operating voltage/operating frequency value for star connection defining the motor (high saturation), (b) a second range in which the motor is still fed in star connection and the characteristic operating voltage/operating frequency value input to the inverter now equals the characteristic operating voltage/operating frequency value for star connection defining the motor (normal saturation), (c) a third range in which the motor is fed in delta connection and the characteristic operating voltage/operating frequency value input into the inverter is lower by a factor of $\sqrt{3}$ than the characteristic operating voltage/operating frequency value for delta connections defining the motor (normal saturation), (d) a fourth range in which the motor is still fed in delta connection and the characteristic operating voltage/operating frequency value input into the inverter is again lower by a factor of $\sqrt{3}$ than the characteristic operating voltage/operating frequency value for delta connections defining the motor, and which thus brings about a lesser saturation of the motor, but which again leads to another increase in speed by $\sqrt{3}$. This sequence of possible operating ranges renders it possible to run the motor from the lowest speeds (slowing down, positioning) to the maximum tolerated surface speeds of the rotor, which for one single motor signifies a utilizable speed range with a ratio of minimum and maximum speed of 1:1000 or higher. With the exception of the range in which there is lower saturation, the motor is operated with nominal torque. The speed range reached in this context is achieved by means of conventional drive technology via 5 different motor types.

Besides, it becomes possible to install a sequence of three-phase asynchronous motors in a motor system which are defined by a common maximum torque (in order to be able to define the maximum power of the same rotor geometry) and by their differently defined characteristic operating voltage/operating frequency values (or by the respective reverse value in Hz/volts). In this case the characteristic operating voltage/operating frequency value corresponding to one of these motors is always one of the elements of a geometrical progression formed with a quotient of $\sqrt{3}$ so that the motors of this motor system are harmonized with each other and the inverter with the quotient $\sqrt{3}$ as law of formation. Such a motor system is the object of this invention and any of these motors of such a motor system will then be connected to the inverter, while for the implementation of the process according to the invention via the factor $\sqrt{3}$ an automatic adaption in relation to frequency change rate, d.c. brake, possibly vector control for very low speeds or conversion of the d.c. brake for precise positioning is effectuated.

The law of formation for the optimization of the motor system with the quotient $\sqrt{3}$ refers to three-phase asynchronous motors. It is possible to achieve an approximation of this law of formation via the number of pole pairs of the motor: suitable amounts of pole pairs permitting technically favorable solutions and speed ranges and the interchangeability of the motors are 1, 2, 3, 5, 9, etc.; this signifies that when approximating the law of formation via the amount of pole pairs the motors that are to be supplied should be 2-pole, 4-pole, 6-pole, 10-pole, 18-pole, etc.

Of two such "neighboring" motors of a motor system which correspond to two neighboring elements of a geometric progression one may be operated optionally in a frequency band from zero to the frequency of $f_i$, $\sqrt{3}.f_i$, $3.f_i$ or $3\sqrt{3}.f_i$ (with a predetermined operating frequency $f_i$ of for example 50 Hz), whereas the other may be operated optionally in a frequency range from zero to the frequency $9.f_i$, $9\sqrt{3}.f_i$, $27.f_i$ and $27\sqrt{3}.f_i$. As a consequence the two elements of a geometric progression formed with 9 as quotient correspond to the characteristic operating voltage/operating frequency values of the two defined motors located "side by side" in the motor system. By means of 2 such motors one may attain an approx. 47 times greater frequency variation range than with one single motor within one single frequency variation range.

For reasons of practical application a motor system is favored in which the frequency bands of the motors overlap by one or two frequency steps: of two "neighboring" motors corresponding to subsequent elements of the geometric progression one may be operated optionally in a frequency band from zero to the frequency of $f_i$, $\sqrt{3}.f_i$, $3.f_i$ or $3\sqrt{3}.f_i$ (with a predetermined operating frequency $f_i$ of for example 50 Hz), whereas the other may be operated optionally in a frequency range from zero to the frequency $3\sqrt{3}.f_i$, $9.f_i$, $9\sqrt{3}.f_i$, and $27.f_i$. (with an overlap of one frequency step) or to the frequency of $3.f_i$, $3\sqrt{3}.f_i$, $9.f_i$, and $9\sqrt{3}.f_i$ (with an overlap of two frequency steps). To the various characteristic operating voltage/operating frequency values of these motors located "side by side" in the motor system correspond consequently two neighboring elements of a geometric progression formed with $3\sqrt{3}$ or 3 as quotient. With two such "neighboring" motors a utilizable frequency range (and thus speed range) may be obtained which is $9\sqrt{3}$ or 27 times greater than what could be obtained with only one of those two motors.

In a four-phase motor the characteristic operating voltage/operating frequency values preferably form a geometric progression of the ratio of $1:\sqrt{2}:2:2\sqrt{2}$, i.e. with the quotient $\sqrt{2}$ as law of formation. The previous explanations on the three-phase motor may be translated to the four-phase motor, the utilizable frequency range (and thus speed range) which may be obtained with such a motor system may be expanded by a corresponding factor of 8, $4\sqrt{2}$ or 4.

According to the invention the dependence of the stator current on its frequency and on the stator voltage may be ascertained in the system motor used and the characteristic operating voltage/operating frequency value of the motor connected to the inverter and, in relation to this and to the circuit of the inverter in star, delta of quadrangle connection, the characteristic operating voltage/operating frequency values that may be input into the control can thus be calculated.

From the assignment of characteristic operating voltage/operating frequency values (or their reverse value in Hz/volts) to the motors the pertaining frequency of the braking impulses may be inferred during the braking process thus leading always to optimum adaption to the inductive load to be braked.

A device for the application of the process, according to the invention, encompasses the following required means and in particular means for the adjustment of a setpoint speed;
means for the adjustment of a current control variable;
means for the adjustment of a frequency change rate;
means for the keeping constant of the stator current frequency or for changing it at the frequency change rate dependent on a corresponding signal for the enabling of the change;
means for measuring an effective value of the stator current;
means for comparing the effective value of the stator current with the current control variable and for generating a corresponding comparison signal; and
means for generating the enabling signal dependent on the comparison signals.

These means are described in further detail at a later instance with the help of an embodiment of the device.

Hereinafter, the invention is described with reference to the drawings.

DETAILED DESCRIPTION OF THE PREFERRED EMBODIMENTS

Figure 1:
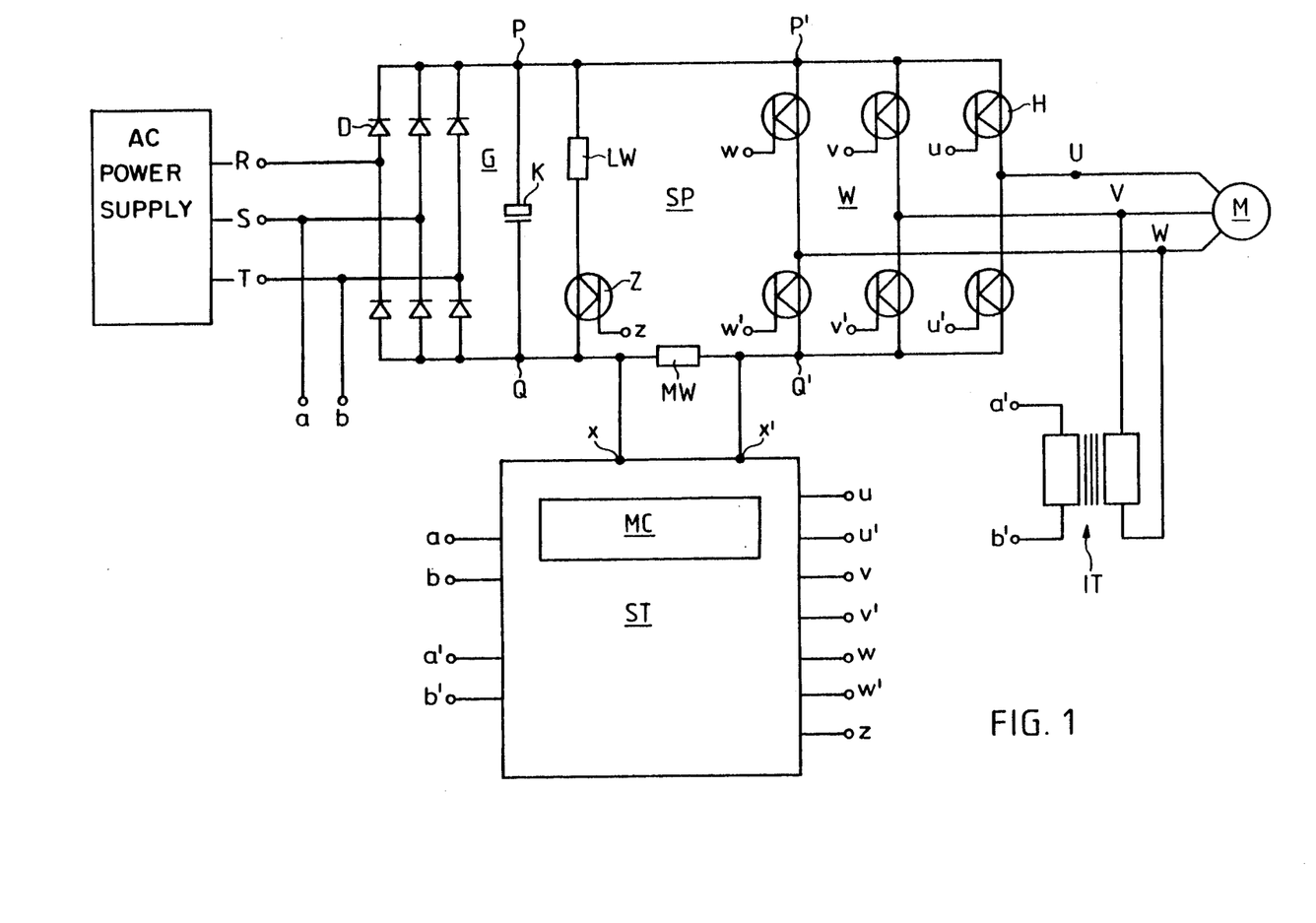
FIG. 1 shows a principle block diagram of a device for the application of the process according to the invention.

In FIG. 1 a device for the application of the process according to the invention is explained by using the example of a three-phase asynchronous motor. The device comprises first of all a feeding unit SP of a three-phase asynchronous motor M and a control unit ST of the feeding unit SP. The rectifier G comprises 6 similar diodes D connected in the customary way and one smoothing capacitor K. The rectifier G draws electrical energy in the form of alternating current from an a.c. voltage mains R,S,T for example of 220/380 volts, 50 Hz, and supplies electrical energy in the form of direct current between the terminals P,Q. Between these terminals P,Q d.c. voltage could also be fed directly from any adequate source.

An inverter W comprises 6 similar switchable semiconductor elements H connected in the usual way, e.g. of the type IGBT ("isolated gate bipolar transistor"). The inverter W gets electrical energy in the form of direct current between the terminals P',Q' and supplies electrical energy in the form of alternating current of a variable frequency at the terminals U,V,W and to the three-phase stator of the asynchronous motor M. In a known manner, depending on the moment of triggering of the semiconductor elements H (terminals u,u',v,v',w,w') by the control unit ST and on the phase of the stator current at the terminals U,V,W the motor M will then be driven, accelerated or slowed down by the electrical energy supplied by the inverter W. In the described embodiment the control of this function is performed by a microcomputer MC contained in the control unit ST, but it could also be executed in another known manner.

The terminals P and P' are linked directly to each other, whereas the terminals Q and Q' are linked via a measuring resistor MW so that the direct current flowing between the terminals P and P' as well as Q and Q' can be measured through the voltage drop at the measuring resistor MW. For evaluation of this drop in voltage it is sent from the measuring resistor MW to the control unit ST (terminals x, x').

From the a.c. voltage mains R,S,T (terminals S,T in the represented example) a feeder line (terminals a,b) leads to the control unit ST.

A possible voltage failure at the a.c. voltage mains R,S,T is ascertained in the control unit ST, whereupon the control unit ST is fed automatically by means of an auxiliary feeder line (terminals a', b'), which in turn gets electrical energy from the motor M (terminals V,W) via an isolation transformer IT. In this way, the control unit ST will still be supplied with electrical energy in the case of a voltage failure. Control of this function is also done by the microcomputer MC which is also programmed in such manner that it immediately initiates a braking maneuver should this situation occur. For the supply of the control unit ST in the case of a mains voltage failure exactly this energy is used which the motor produces during the braking maneuver, and this until the motor has become essentially free of energy so that a high degree of safety of the drive is guaranteed.

Besides, another switchable semiconductor element Z for example of the same type as the semiconductor elements H is located in the control unit. Usually, the semiconductor element Z is not conductive.

In cases of excessive voltages at the smoothing capacitor K the semiconductor element Z is switched conductive by the control unit ST (terminal z) in order to connect the terminals P,Q by a load resistor LW and thus protect the smoothing capacitor from overvoltage.

In cases of voltage failure at the rectifier G the semiconductor elements H depending on the phase of the stator current at the terminals U,V,W are triggered in such manner that the three-phase stator current of the motor M supplies electrical energy which is converted into direct current by the inverter W (terminals P',Q') which will then be switched through from the semiconductor element Z (terminal z) to the load resistor LW. Subsequently, the mechanical energy stored in the motor M is used thermally in the load resistor LW and the motor is braked.

Also during this process the smoothing capacitor K is to be protected from overvoltage, especially if the energy of the braking maneuver cannot be brought into the load resistor with the necessary quickness. For this purpose a hysteresis window with one predetermined maximum and one minimum value each (e.g. 650 to 750 volts) is determined, and the load resistor LW is activated (semiconductor element Z of control unit ST is switched conductive, terminal z) if the d.c.voltage at the smoothing capacitor K lies within this hysteresis window. If the d.c.voltage at the smoothing capacitor exceeds the predetermined maximum value the load resistor remains activated, but the control unit ST causes the inverter W (terminals u,u',v,v',w,w') to turn off the stator current of the braking motor M. Since the motor is not excited anymore and thus is not working as a generator the d.c.voltage at the smoothing capacitor K will drop because the electrical energy stored in the smoothing capacitor K is consumed thermally in the load resistor LW. During this time the frequency change at the inverter W is also stopped by the control unit ST. Since the motor M continues running brakeless, the motor M and the inverter W maintain approximately the same speed of rotation (speed of motor M, frequency of the inverter W). After the d.c.voltage at the smoothing capacitor K has dropped below the predetermined minimum value (i.e. the smoothing capacitor K has been discharged sufficiently by the load resistor LW) the control unit ST causes the inverter W (terminals u,u',v,v',w,w') to reactivate the stator current so that the motor M is excited again and starts working as generator again thus causing a prolongation of the braking maneuver. The control of this function is performed once more by the microcomputer MC.

Naturally, such a repeatedly interrupted braking process is less effective than a steady braking process. The cause is an excessively high-ohmic load resistor LW and it is advisable to have this signaled by the control unit ST, or by the microcomputer MC.

Figure 2:
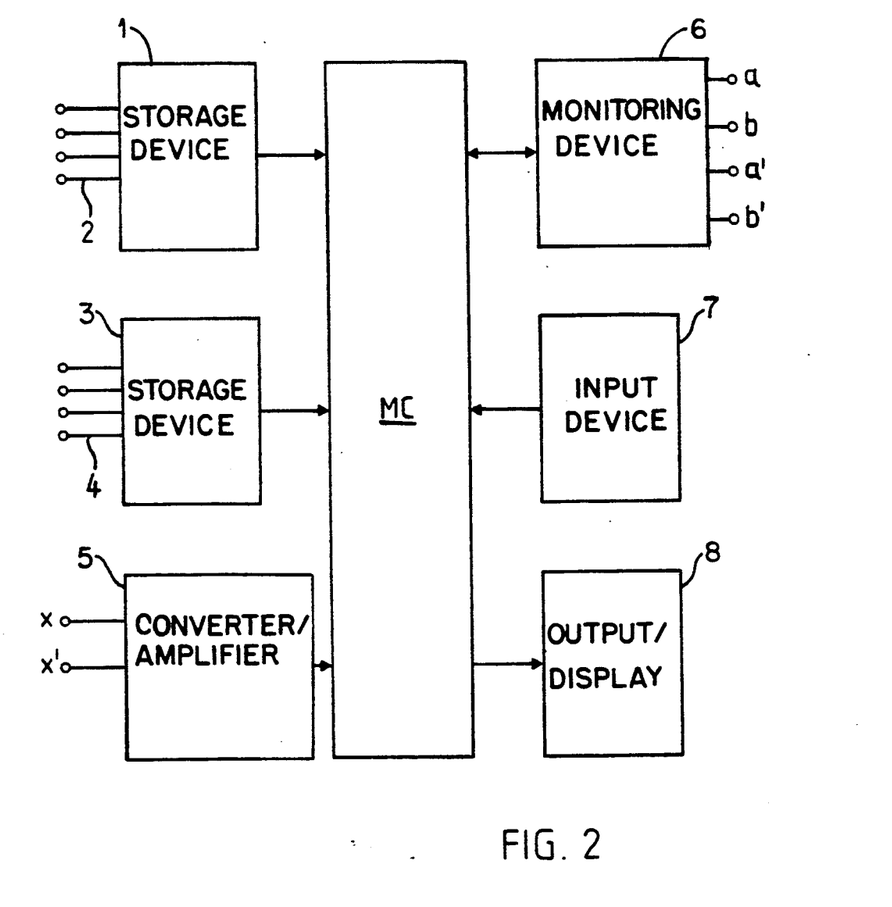
FIG. 2 shows a principle block diagram of a control part of the device for the application of the process according to the invention.

In principle, the braking and the accelerating process correspond to one another, it is only that the current flows through the measuring resistor MW in one or the other direction and the frequency is changed into the one or the other direction (increase or drop). The explanation of the process according to the invention is now carried on with special reference to FIGS. 2 and 3. In FIG. 2 the function of the control unit ST is explained by means of a block diagram. For the application of the process according to the invention at first a current control variable is specified for the control unit ST which—in the control unit—determines a desired and not-to-be-exceeded-by-too-much effective value of the three-phase stator current of the motor M during the change of speed (acceleration or slowing down). The current control variable may be adjusted at the control unit ST for example in a digital form or be input in another way: in FIG. 2 a digital value is input into the storage 1 via the lines 2 (in the place of the required amount of lines only 4 of them were represented).

Furthermore, a set-point speed of the motor M which is to be reached is input into the control unit ST. Also the set-point speed may be adjusted at the control unit ST for example in a digital form or input in any other way: in FIG. 2 a digital value is input into the storage 3 via the lines 4 (also in this case only 4 of them were represented).

It should also be stated in this place that this input set-point speed of the motor M is related to the motors used via the quotient $\sqrt{3}$ (as law of formation for the sequence of motors in the motor system) and needs to be selected accordingly. If instead of the absolute set-point speed a relative value is input into the control unit ST, e.g. a percentage between 0 and 100% of the maximum tolerated speed, the control unit ST can take care automatically that the input relative value is multiplied with the appropriate factor from the progression formed with $\sqrt{3}$ as quotient, in order to obtain the absolute set-point speed of the motor M required by the control unit ST.

In addition, the predetermined frequency change rate is input into the control unit. It may advantageously be input into the same storage 3 and in the same way as the set-point speed of the motor M, because both variables are available in the same unit (dimensionless number per time unit). Because it is not changed very often, the frequency change rate could in another version be input into the input device 7 which is described in detail at a later instance.

The speed is fed to the microcomputer MC which will then establish whether the frequency of the stator current is to be increased or reduced in order to reach the set-point speed of the motor M by changing the frequency of the electrical rotary field. According to the results of this establishing process, i.e. according to the direction of the resulting speed change, the microcomputer MC will now compare the setpoint speed with the frequency of the stator current resulting from the change. In this process the microcomputer MC takes into consideration that the set-point speed of the motor M results from the difference between the frequency of the stator current and the slip frequency of the motor M.

If the microcomputer MC ascertains that the set-point speed will essentially be reached by means of this change in the frequency of the stator current, it will take care that nothing else is done, for the desired result has been achieved. If this is not the case the microcomputer MC will make sure that the following steps are performed.

In response to the change of frequency of the stator current its effective value will change. This will now be measured as voltage drop at the measuring resistor MW and be fed to the control unit ST (terminals x,x'). In the circuit unit 5 which contains an A/D-converter and an amplifier, data on this drop in voltage is collected and processed into a value which then is fed to the microcomputer MC. The microcomputer MC compares this fed value with the current control variable and the result of the comparison is evaluated as has been previously described.

As a consequence the frequency of the stator current increases gradually in the course of time . At a certain moment the set-point speed is essentially reached by means of the last change of the stator current frequency, whereupon the microcomputer provides that the frequency is not changed anymore, this signifies that the desired result has been attained and the control unit ST will now keep the speed of the motor M constant at the attained value.

The course of the stator current frequency in relation to time is described at a later instance in the context of FIG. 3.

It is a monitoring device 6 for the power supply of the control unit ST connected with the microcomputer MC that performs the already described shifting of the power supply between the feeder line to the a.c.voltage mains R,S,T (terminals a,b) and the auxiliary feeder line to the isolation transformer IT (terminals a',b'). This measure helps guarantee that the control unit ST will still be supplied with electrical energy when there is a voltage failure at the a.c.voltage mains, which renders it possible to brake the motor optimally in cases of voltage failure at the a.c.voltage mains as has been previously described and thus contributes to the operating safety of the driven machine.

For inputting the data needed by the microcomputer MC as e.g. the characteristic operating voltage/operating frequency value of the motor M an inputting device generally designated with 7 has been provided.

In addition, a output and/or display device generally designated with 8 has been provided, serving the purpose of displaying and/or outputting the data that have been processed by the microcomputer MC such as e.g. the signalization of field weakening in the motor M, acceleration, braking, reaching of the set-point speed, etc.

Figure 3:
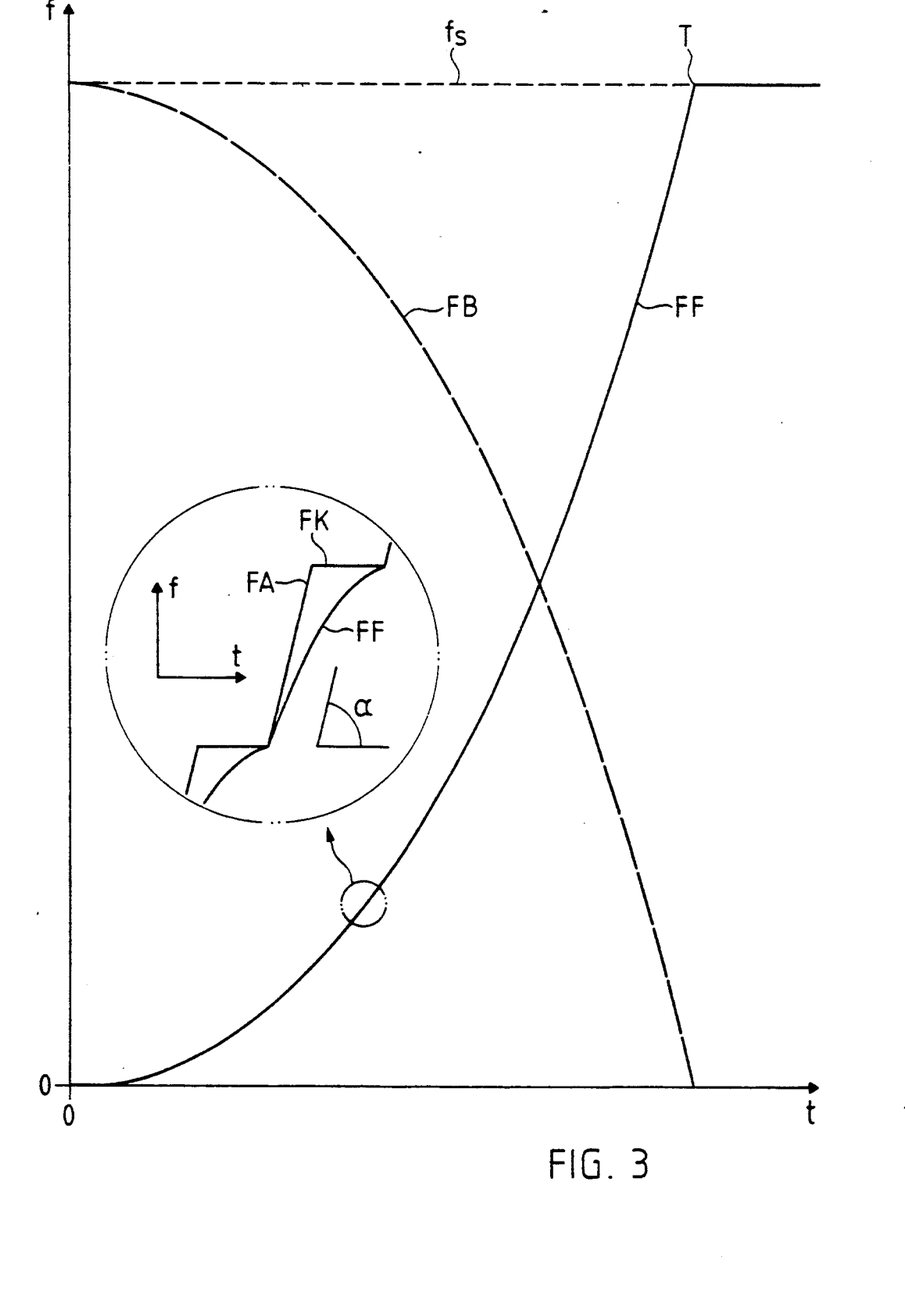
FIG. 3 shows a graphic representation of course and frequency of the stator current in relation to time and an enlarged section of this course.

FIG. 3 is a graphic representation of how the course of the frequency f of the stator current is controlled in respect of time t. There is also a representation of an enlarged section of the course to be described.

A change of the stator current frequency by the resulting frequency increase (characteristic curve FA in the enlarged section) augments the effective value of the stator current in such manner that due to the load moment the current control variable is even somewhat exceeded for at least a short period of time and thus the frequency is kept constant (characteristic curve FK in the enlarged section). Since the motor changes its speed correspondingly, the effective value of the stator current drops when the frequency is kept constant and due to the conversion of the fed electrical energy below the current control variable so that the next change of the stator current frequency is performed (characteristic curve as FA in the enlarged section). The result is a step-shaped course of the stator current frequency (characteristic curves FA,FK). However, if the frequency change rate is chosen as being small enough, the steps will be so small, that they are hardly noticeable and the resulting variation of the motor speed M in respect of time is essentially (i.e. seen macroscopically) steady as is shown in FIG. 3 by the characteristic curve FF representing the effective speed (this characteristic curve FF is repeated in the enlarged section and represented with its genuine garland shape). In an optimum time T the frequency f of the stator current reaches its desired value $f_s$ and resulting from it is the speed of the motor M by taking into the consideration the slip.

In the enlarged section of FIG. 3 the time axis t and the frequency axis f are repeated, the sides of the represented angle $\alpha$ are parallel to the time axis t and to the characteristic curve FA of the frequency increase and the frequency change rate is therefore equal tg($\alpha$).

FIG. 3 also shows the characteristic curve FB, which represents the effective speed, for a braking of the motor M: it is essentially symmetrical to the characteristic curve FF. Both characteristic curves FF and FB are essentially steady and parabolic if seen under a macroscopic aspect until the corresponding desired value $f_s$ or zero is reached, and both are essentially a festoon, i.e. garland-shaped, if view from a microscopic point of view: because of the high degree of analogy between the characteristic curves FB and FF a separate representation of an enlarged section of the characteristic curve FB in FIG. 3 has been dispensed with.

The microcomputer MC can measure the duration of the frequency increase (characteristic curves FA or FA') resulting in the case of a predetermined frequency change rate: this duration corresponds to the electrical time constant of the motor under dynamic conditions with the given stator current predetermined by the current control variable.

The microcomputer MC can also measure the total duration of the speed increase per frequency step with constant frequencies (characteristic curves FA and FK). This duration ("motor run-up time") is needed by the motor in order to catch up with the speed and thus to cause a corresponding drop of the effective value of the stator current, which in turn provokes the next frequency increase (characteristic curve FA'): this duration corresponds to the mechanical time constant of the motor which is determined by the moment of inertia.

The two measured duration values describe an important operating parameter of the motor M and its mechanical load, i.e. of the whole drive: from it a measure for the already mentioned "torsional rigidity of the drive" may be obtained. It is therefore recommendable for purposes of these measurings to chose the frequency change rate as being so great that due to the thereby tremendously increased effective value of the stator current the frequency remains constant temporarily also when seen under a macroscopic aspect, so that the characteristic curve of the resulting variation of the speed in respect of time follows essentially the shape of a festoon or garland. The characteristic curve FF of FIG. 3 is even without enlargement clearly a festoon, i.e. garland-shaped, as represented in the section of FIG. 3.

If the frequency change rate is high in respect of the run-up time of the motor, there will be longer characteristic curves FA and FK and a correspondingly smaller amount of bigger elements of the garland-shaped characteristic curve FF. The motor will then not be operated in the best possible way. On the other hand, the shorter the characteristic curves FA and FK and the more frequent and minuscule the elements of the garland-shaped characteristic curve the more responsive ("dynamic") is the drive. For purposes of measurement it is therefore recommended to bring about the frequency increase (characteristic curve FA or FA') in such manner that the effective value of the stator current is always in the proximity of the current control variable, thus exceeding it only by so much as is necessary for ensuring the measurement so that the frequency is kept constant for only a short time interval (characteristic curve FK). The microcomputer MC may be programmed accordingly.

It should also be mentioned in this place that important additional functions of the microcomputer MC consist in that they control the previously mentioned special processes, that is: the optimized holding process at the end of a braking maneuver, the shifting between star connection and delta connection while keeping constant the magnetic conditions of the stator and the automatic adaption to different motors of a system of motors harmonized with each other again while keeping constant the magnetic conditions of the stator.

In the previous description of the invention different functions in the control unit ST are carried out and performed by a microcomputer MC. This is to be understood as example: those functions may also be carried out and performed by circuits and assemblies ("hardware") especially designed for this purpose in a known manner.

Figure 4:
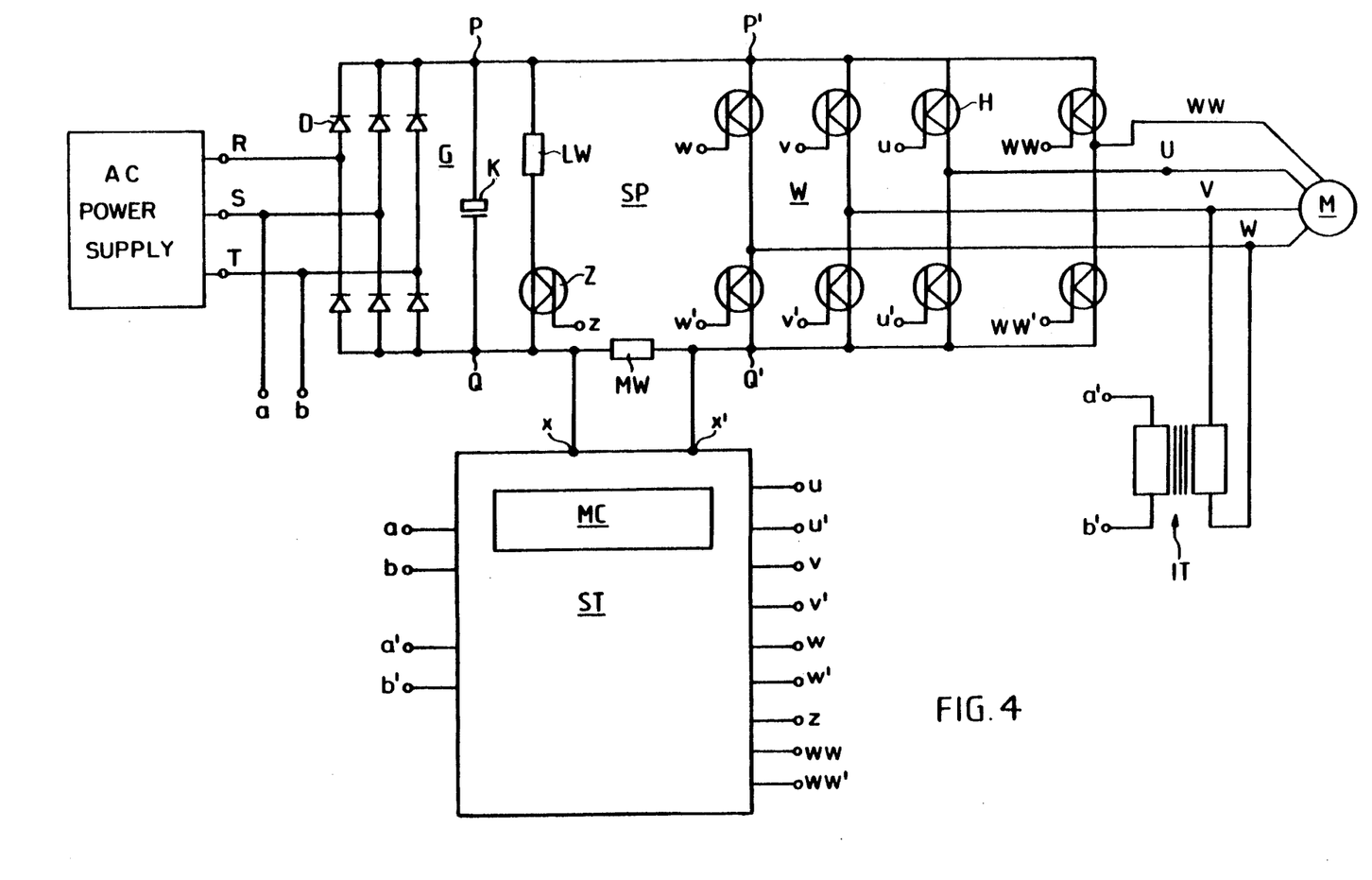
FIG. 4 shows a principle block diagram of a device for the application of the process according to the invention utilizing a four-phase asynchronous motor.

In FIG. 4 a device for the application of a process to the invention is shown utilizing a four-phase asynchronous motor. The four-phase motor M requires the output of an additional stage of the inverter W, which is connected to the motor M via line WW. The overall operation of the motor system is identical to the operation of the system utilizing a three-phase asynchronous motor, with the exception that the phase and voltage input characteristics of the motor are different.

In general, the application of the invention is in no way whatsoever limited to the previously described procedure which has only been given as example. Many equivalent procedures, whose application does not leave the scope of the invention, are known to the expert.

In particular, linear motors can be considered a particular embodiment of asynchronous motors onto or with which, respectively, the process, the device and the motor system according to the invention are applicable.

I claim:

1. A process for changing the effective speed of a polyphase asynchronous motor until reaching a set-point speed, the polyphase stator current of the motor having a variable frequency and an effective value which is determined by a current control variable, comprising the steps of:
   adjusting the frequency of the stator current at a predetermined frequency change rate corresponding to a desired speed increase or decrease;
   measuring the effective value of the stator current which changes as a result of said change of frequency;
   comparing said effective value of the stator current to the current control variable to determine if the effective value is greater than the control variable;
   maintaining the frequency of the stator current at an attained value if the effective value is greater than the control variable;
   comparing the attained value of the frequency with the set-point speed to determine if the attained value of the frequency corresponds to the set-point speed, and
   maintaining the frequency at the attained value if the attained value corresponds to the set-point speed when a motor slip value corresponds to the current control variable.

2. The process according to claim 1, wherein an invertor supplies the polyphase stator current of the motor, said invertor drawing electrical energy from an a.c. voltage source and obtaining d.c. via a rectifier, such that the motor is accelerated or decelerated by the electrical energy.

3. The process according to claim 2, further comprising comparing a variation of the stator voltage with respect to frequency to determine if said stator voltage deviates from a characteristic operating voltage/operating frequency value, and providing a signal for indicating field weakening in the motor if a deviation occurs.

4. The process according to claim 2, further comprising supplying the invertor with electrical energy from the polyphase stator current of the motor, converting said energy to d.c. and switching said d.c. through a load resistor in order to decelerate the motor in a guided manner in the event of voltage failure at the a.c. voltage source.

5. The process according to claim 4, wherein the invertor is supplied with electrical energy from the polyphase stator current of the motor to supply itself and other control circuits with electrical energy in the event of voltage failure at the a.c. voltage source.

6. The process according to claim 4, wherein the invertor is turned off if the voltage at the load resistor exceeds a predetermined maximum value, and is turned on again if the voltage at the load resistor falls below a predetermined minimum value while frequency is maintained at a constant value.

7. The process according to claim 1, wherein the frequency change rate is chosen as so small that the resulting variation of the speed with respect to time is essentially steady.

8. The process according to claim 1, wherein the frequency change rate is chosen as being so large that a characteristic curve of the resulting variation of the speed with respect to time follows essentially a festoon or garland-shaped, and that a measure of torsional rigidity of the motor under load may be obtained from characteristic values designating dimensions of a component of the garland-shaped characteristic curve.

9. The process according to claim 2, further comprising simultaneously switching the invertor between a motor feed according to its characteristic operating voltage/operating frequency value for star connections, and a motor feed according to its characteristic operating voltage/operating frequency value for delta or quadrangle connections, and wherein the frequency of the stator current is changed by a factor of $\sqrt{3}$ or $\sqrt{2}$ to accelerate or decelerate the motor, such that with a speed increase by $\sqrt{3}$ or $\sqrt{2}$ the torque of the motor remains essentially the same.

10. The process according to claim 2, wherein a characteristic operating voltage/operating frequency value of the motor used for the operation of the invertor and the frequency of the stator current are simultaneously changed in the same direction by a common factor, such that the torque of the motor remains constant.

11. The process according to claim 1, further comprising repeating the steps of adjusting the frequency, measuring the effective value of the stator current and comparing the effective value to the current control variable if the effective value is smaller than the control variable until the effective value of the stator current is greater than the current control variable.

12. A motor system comprising a plurality of 3-phase or 4-phase asynchronous motors having the same maximum torque while having different characteristic operating voltage/operating frequency values related as elements of a geometric progression in which a quotient of a ratio of the operating voltage to the operating frequency is equal to $\sqrt{3}$ or $\sqrt{2}$ so that the motors of the motor system are harmonized with each other.

13. A device for changing the effective speed of a polyphase asynchronous motor until a set point is reached, the polyphase stator current of the motor having a variable frequency and an effective value which is determined by a current control variable, said device comprising:
   means for the adjustment of said set point speed;
   means for the adjustment of said current control variable;
   means for the adjustment of a frequency change rate;

adjustment means for maintaining a constant stator current frequency or for changing said frequency at the frequency change rate, said adjustment means being dependent on a corresponding signal for the enabling of the change;

means for measuring an effective value of the stator current;

means for comparing the effective value of the stator current with the current control variable and for generating a corresponding comparison value; and means for generating the enabling signal dependent on comparison signals.

14. A motor system comprising a plurality of polyphase asynchronous motors, said motors being harmonized with each other and each having an identical maximum torque value, said motors further having characteristic operating voltage/operating frequency values related as elements of a geometric progression in which a quotient of a ratio of the operating voltage to the operating frequency is equal to $\sqrt{3}$ or $\sqrt{2}$, wherein one of said motors is connected to an invertor which supplies a polyphase stator current to the motor, said invertor drawing electrical energy from an a.c. voltage source and obtains d.c. through the provision of a rectifier, such that said motors are accelerated or decelerated by said electrical energy.

15. The system according to claim 14, wherein the value $\sqrt{3}$ or $\sqrt{2}$ is further used as a reference value for a frequency change rate, for a braking process executed at the motor and/or for a vector-controlled positioning process performed by the motor, and for an inductance value characterizing the motor used.

16. The motor system according to claim 14, wherein the characteristic operating voltage/operating frequency value of the motor connected to the invertor is determined from the relationship of the stator current to its frequency and the relationship of the stator current to the stator voltage.

17. The motor system according to claim 16, further comprising a control device, wherein the characteristic operating voltage/operating frequency value which is input to the control device is determined from the characteristic operating voltage/operating frequency value of the motor connected to the invertor in relation to the connection of invertor to the system in a star connection, delta connection or quadrangle connection.

* * * * *